Jan. 9, 1951  E. L. PARR  2,537,544
HINGED, CAN PUNCTURING, PITCHER LID WITH EXTENSION
FORMING AND ENGAGING HANDLE
Filed Sept. 13, 1946
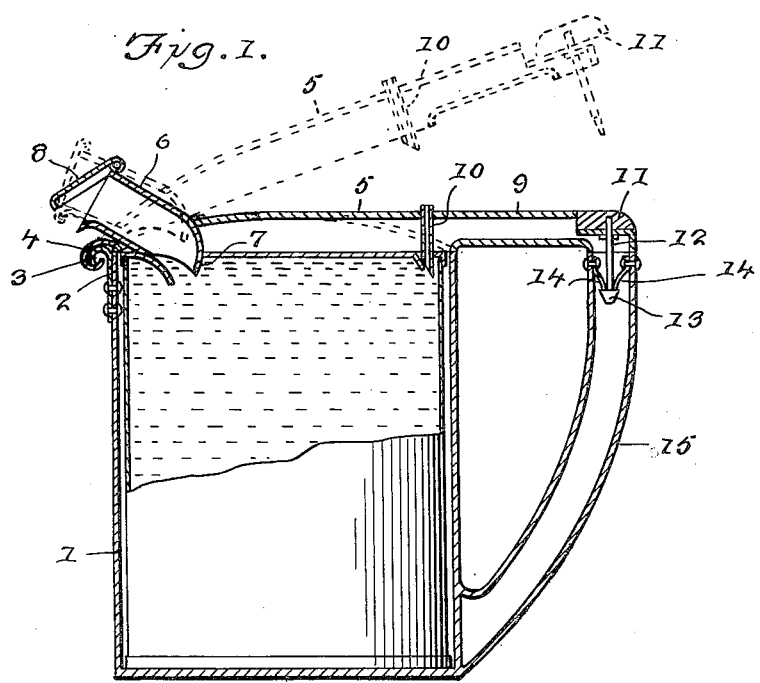
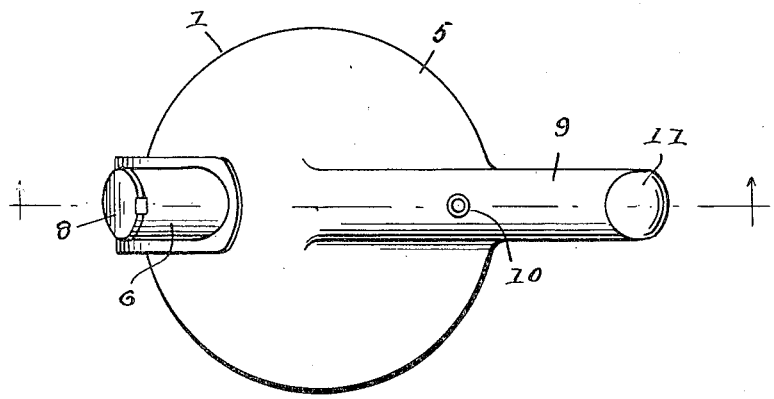
INVENTOR.
Edward L. Parr
BY Victor J. Evans & Co.
ATTORNEYS Patented Jan. 9, 1951

2,537,544

UNITED STATES PATENT OFFICE 2,537,544

HINGED, CAN PUNCTURING, PITCHER LID WITH EXTENSION FORMING AND ENGAGING HANDLE

Edward L. Parr, Mason, Nev.

Application September 13, 1946, Serial No. 696,883

1 Claim. (Cl. 222—83.5)

This invention relates to improvements in milk pitchers and the like, and more particularly to the provision of a pitcher especially adapted to be used to dispense milk from cans.

Evaporated milk, condensed milk, syrups, etc., are commonly sold in cans, and it is the general custom to punch two holes in the can to enable the substance to be poured from the can. However, this method is unsatisfactory as the pouring is awkward and the contents of the can are not protected from dust and the like.

It is, therefore, an object of this invention to provide a pitcher in which a can may be placed and punctured to facilitate the flowing of the contents of the can, the pitcher having a pouring spout and means for puncturing cans.

A further object is the provision of a can holding pitcher having means for quickly and effectively puncturing cans, and having also means to protect the contents of cans from dust, insects, and the like.

These and other objects are attained by the novel construction and arrangement of parts hereinafter described and illustrated by the accompanying drawings, forming a part hereof, and in which:

Fig. 1 is a sectional view taken on the line 1—1 of Fig. 2.

Fig. 2 is a plan view of a pitcher embodying the invention.

Referring to the drawings, the pitcher is shown to have a main body 1 proportioned to receive a common type of milk can. Riveted to the body 1 or otherwise secured thereto is a strip 2 with a curled upper end 3 cooperating with a similar curled end or strap 4 on a lid 5 to form a hinge for the lid.

Adjacent the hinge the lid 5 is provided with a spout 6 having a tongue 7 adapted to pierce a can positioned in the pitcher. A cover 8 closes the mouth of the spout.

A handle 9 is substantially integral with the lid 5 and passing through the handle 9 is a tube 10 having a sharp can piercing lower end to provide an air vent.

At the outer end, the handle 9 is provided with a rotatable block 11 to which is attached a pin 12 having at its lower end a triangular member 13 which passes between two spring strips 14 positioned in the hollow upper section 15 of the handle. By means of the triangular member 13 and the strips 14, the lid can be locked tightly on the pitcher to protect the contents of the can. To release the lid, the block 11 is rotated 90 degrees to place the member 13 substantially parallel to the strips 14 so that member 13 can pass freely between strips 14.

It will be seen that there has been provided a simple and effective pitcher for not only puncturing cans to enable the contents to be poured freely therefrom, but the pitcher safely protects the contents of the cans from dust, insects, and other undesirable matter.

The above description is to be considered as illustrative and not limitative of the invention, of which modifications can be made without departing from the spirit and scope denoted by the appended claim.

The invention having been described, what is claimed is:

In a milk can pitcher, a hollow body having a cylindrical shape for receiving therein a milk can, said body including a horizontally disposed bottom and an annular side wall, a curved strip secured to the upper end of said side wall, a lid, a curved strap secured to said lid for coaction with said strip to define a hinge connection between said lid and body, a spout positioned on said lid and having a tongue adapted to puncture the milk can, a cover hingedly connected to the upper end of said spout, a tube carried by said cover and having a sharp pointed end for piercing the milk can, a handle including a hollow section having its lower end secured to said side wall, a pair of spring strips positioned within said hollow section and secured thereto, said spring strips having their lower ends arranged adjacent to each other, said lid including an extension adapted to overlie said handle, a rotatable block carried by said extension, a pin having its upper end secured to said block, and a triangular member carried by said pin for engagement with the lower ends of said spring strips.

EDWARD L. PARR.

REFERENCES CITED

The following references are of record in the file of this patent:

UNITED STATES PATENTS

| Number | Name | Date |
|---|---|---|
| 1,113,270 | Werner | Oct. 13, 1914 |
| 2,170,282 | Van Der Spek | Aug. 22, 1939 |
| 2,246,419 | Luce | June 17, 1941 |
| 2,304,457 | Hagan | Dec. 8, 1942 |